4 Sheets—Sheet 1.

W. HALEY.
Mold for Pressed Glassware.

No. 234,564. Patented Nov. 16, 1880.

Witnesses:
R. B. Turpin
J. H. Shepherd

Inventor
William Haley,
By R. S. & A. P. Lacey, Att'ys.

W. HALEY.
Mold for Pressed Glassware.

No. 234,564. Patented Nov. 16, 1880.

Inventor:
William Haley,
By R. S. & A. P. Lacey, Att'ys.

W. HALEY.
Mold for Pressed Glassware.

No. 234,564.    Patented Nov. 16, 1880.

Witnesses:
P. B. Turpin
J. H. Eyphard

Inventor
William Haley,
By R. S. & A. P. Lacey, Att'ys

W. HALEY.
Mold for Pressed Glassware.

No. 234,564.  Patented Nov. 16, 1880.

Witnesses:
P. B. Turpin
J. H. Sypherd

Inventor:
William Haley
By R. S. & A. P. Lacey
Att'ys:

UNITED STATES PATENT OFFICE.

WILLIAM HALEY, OF PITTSBURG, PENNSYLVANIA.

MOLD FOR PRESSED GLASSWARE.

SPECIFICATION forming part of Letters Patent No. 234,564, dated November 16, 1880.

Application filed February 17, 1880.

*To all whom it may concern:*

Be it known that I, WILLIAM HALEY, a citizen of the United States, and resident in Pittsburg, in the county of Allegheny and State of Pennsylvania, have invented certain new and useful Improvements in Molds for Pressed Glassware; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to furnish molds in which the difficulties heretofore experienced in the manufacture of pressed glassware shall be entirely obviated.

It has also for its further object to furnish molds specially adapted to be used with the steam-presses now coming into use in the manufacture of pressed glassware.

It consists in the novel construction and application of a frame for holding the molds, and in the peculiar construction of the molds themselves, all of which will be hereinafter fully explained, and pointed out in the claims.

Figure 1:
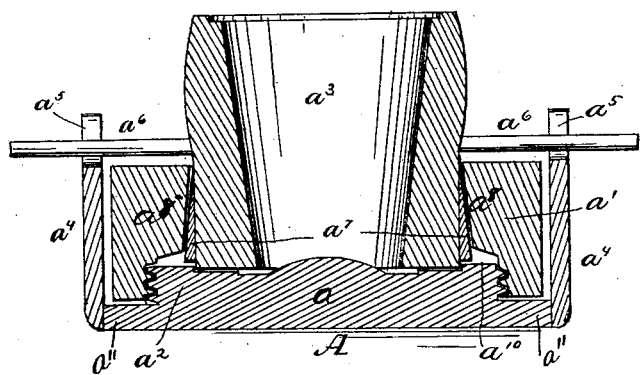
Figure 2:
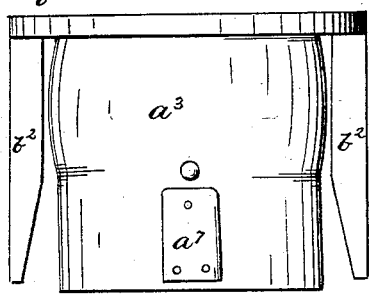
Figure 3:
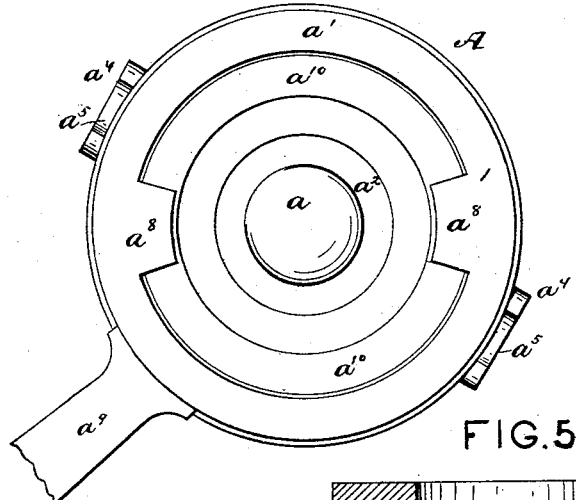
Figure 4:
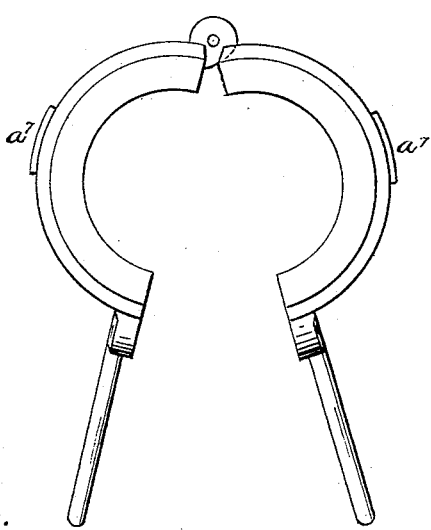
Figure 5:
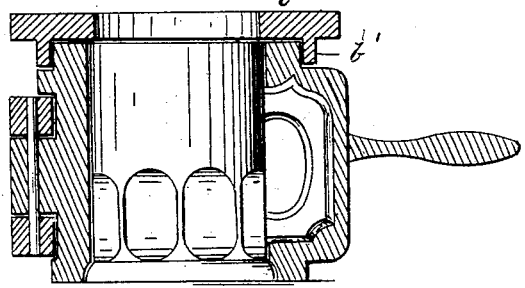
Figure 6:
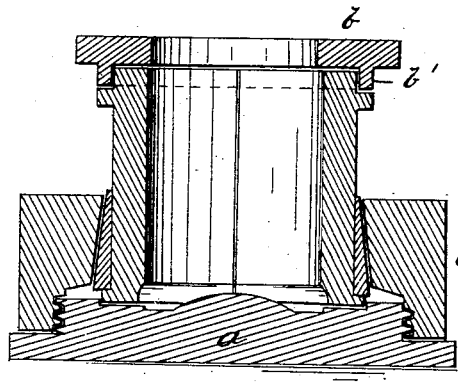
Figure 7:
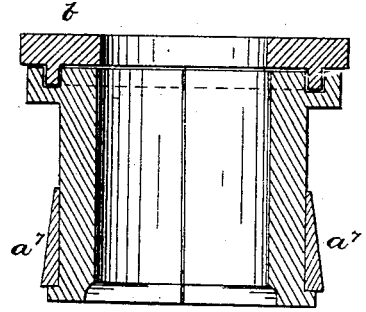
Figure 8:
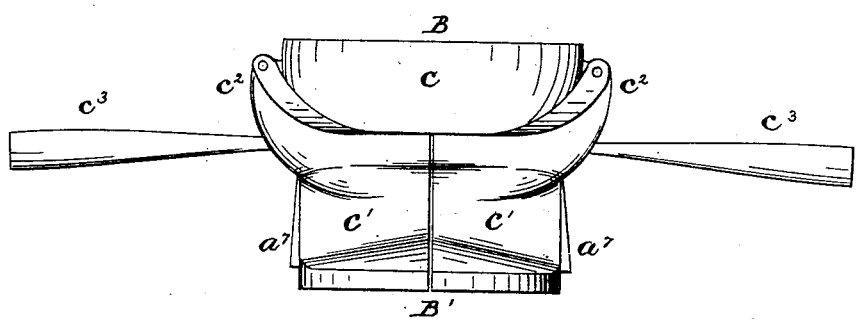
Figure 9:
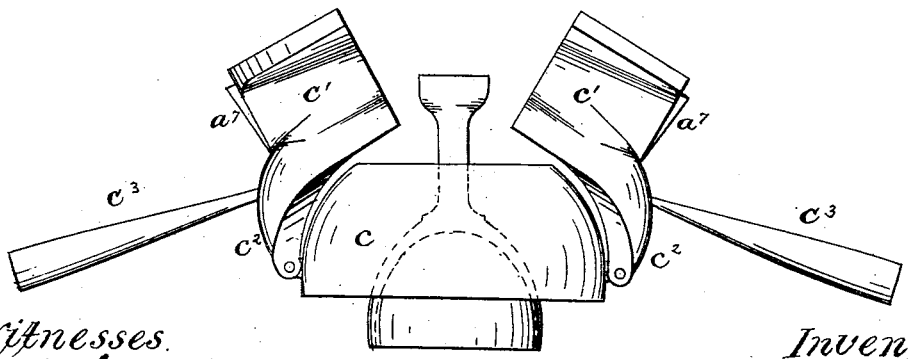
Figure 10:
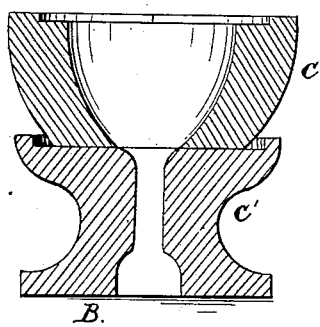
Figure 11:
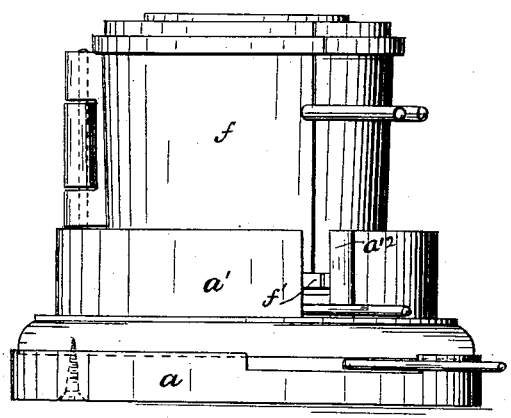
Figure 13:
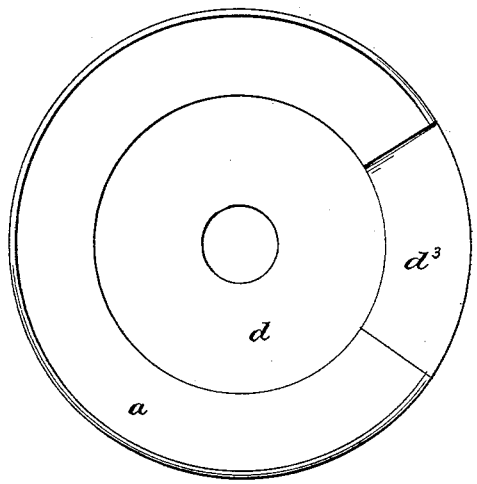
Figure 12:
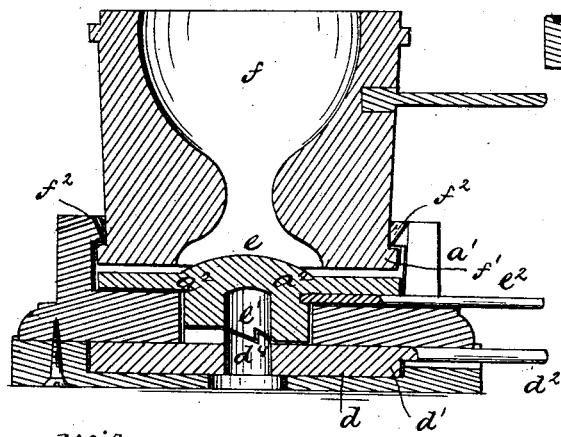
Figure 12:
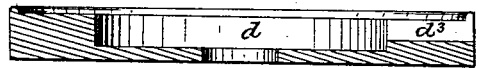
Figure 14:
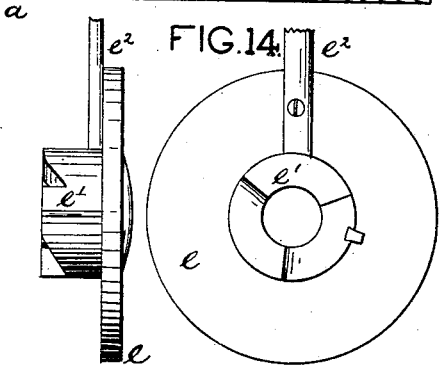
Figure 15:
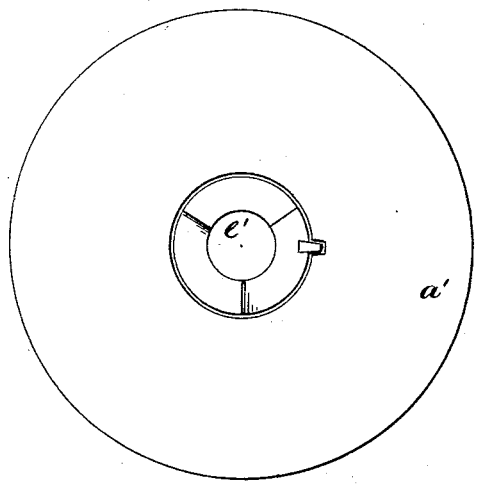

In the drawings, Figure 1 is a vertical cross-section of the frame and mold. Fig. 2 is a mold with my improved mold-ring placed on it. Fig. 3 is a plan of my improved frame. Figs. 4 and 5 show a plan view and a vertical section of a mug-mold with my improved mold-ring thereon. Figs. 6 and 7 show the method of securing the mold in the frame and applying the mold-ring thereto by a modified construction of the top of the mold. Figs. 8, 9, and 10 show a side elevation and an inverted elevation and a vertical section of my improved mold for making stem-ware, and its construction so that it can be held in my improved frame. Fig. 11 is a modified construction of the frame, having a removable bottom and a relieving-cam. Fig. 12 is a vertical cross-section of the frame, as shown in Fig. 11; and Figs. 13, 14, and 15 are details of the frame shown in Fig. 11, and Figs. 16, 17, and 18 are views showing modifications adapted to a mold hinged at the top instead of at the side or bottom.

In the manufacture of glass the greatest number of articles can be pressed in a given time in what is called the "solid mold." The number produced from what are called "open-and-shut molds" is much less than the number produced when the solid mold is employed. This limitation of the number produced by the open-and-shut molds is due to the method by which the mold is attached to the bottom plate, and to the great care which must be exercised in removing the mold from the cast.

The ordinary open-and-shut mold has a dovetail groove cut around on its inner side, which clamps around a corresponding projection formed on the bottom plate. The mold is first closed around the projection on the bottom plate and then fastened by a key, after which the glass is pressed.

To remove the glass the mold must first be unkeyed and the glass lifted off the bottom plate by the forks or other well-known implements. All this takes up time and requires great care and skill on the part of the operator.

The ordinary open-and-shut molds are also liable to get out of order by reason of their having so many parts that are liable to yield to the great pressure required to form the glass, and the constant removing and replacing of the key soon causes wear and tear and the parts become loose, so that after a time the said key will not tighten up the mold as when all the parts are new. The continued application on the dovetail attachment above referred to wears off the edges and causes the joints to show, and the sharp angles or joints of the mold are broken, and by reason thereof "lips" and seams are formed on the glass.

My invention obviates all these and many other objections which I could name, and saves heavy expense in repairs.

In my invention the molds are light and require less skill on the part of the operator, while the number of articles of ware made in a given time—as, for example, in a "turn" of five hours—will be as great with an open-and-shut mold as with a solid mold; nor will the design or pattern of the ware make any difference, for I can make figured ware with as great facility as I can make plain ware. Further than this, the ordinary molds are not adapted for use on the steam-press recently patented to my brother, Jonathan Haley, for the manufacture of pressed glassware. The ordinary molds will not deliver the ware fast enough, nor can the ware be taken out of the molds without getting out of shape, while the press works on its self-acting principle and operates its own molds.

While my invention can be used in the ordinary hand operations, it is specially adapted for use in the steam-press. The molds are light and can be easily removed from a set upon the bottom plate. They can be lifted with the glass in them and placed in suitable position for the air to play upon the ware or upon the molds to be cooled sufficiently fast to be removed at the pleasure of the operator. Additional molds being provided, the one containing the new-made glass is removed from the press and is replaced by an empty one, thus keeping the press working at its highest capacity.

In order to fully illustrate my invention more clearly, I have shown it in the drawings in many separate pieces or parts, yet it will be understood that all these refer to the same principle.

In Fig. 1 is shown a frame, A, which is composed of a bottom plate, $a$, and a frame-ring, $a'$. The bottom plate, $a$, is formed with a raised central disk, $a^2$, which has its upper surface grooved, carved, or corrugated in any figure desired to be formed on the bottom of the ware, or so that it will support the foot or under end of the mold.

The lower end of the frame-ring $a'$ fits snugly around the raised central disk, $a^2$, and is threaded, as shown, and turns down on a corresponding thread formed on the outer periphery of the raised center $a^2$. I prefer to unite the frame-ring and disk in the manner described, and in this way secure the necessary downward tightening movement required to be given to the ring, for purposes hereinafter explained. Instead of the screw-fastening the ring could be secured to the bottom plate by any well-known method, so that it will turn freely, and the means for tightening the molds could be by inclines or cams on the inner side of the ring, tightening on corresponding inclines on the outer side of the molds, as will be hereinafter more fully explained.

The frame-ring $a'$ receives and holds the lower end of the mold, whether the latter be a solid mold, $a^3$, or an open-and-shut mold, as shown in Figs. 4, 8, 9, 11, or 18.

On the outer edge of the bottom plate, $a$, and diametrically opposite each other, I fix two standards, $a^4$ $a^4$, which extend upward outside of the ring $a'$, and are provided with notches $a^5$ in their upper ends to receive the ends of the handles $a^6$ of the mold. These standards do not support the mold, but serve as stops to prevent the mold from being turned on the bottom plate when the frame-ring $a'$ is turned, and they also serve as a guide for the operator in putting the mold into the frame.

On the outer side of the mold I place wedge-shaped pieces $a^7$, which are engaged by corresponding pieces $a^8$, fixed on the inner side of the frame-ring $a'$. The mold is placed on the bottom $a$, and within the ring $a'$, with the handles $a^6$ resting in the notches in the standards $a^4$. The ring is then turned slightly by its handle and the wedges $a^8$ engage the wedges $a^7$ and the screw lowers the ring, and the mold is thereby fixed rigidly in its place. The stops $a^4$ hold the handles $a^6$ and prevent the mold from turning with the frame-ring.

Instead of the wedge fastenings hereinbefore described, inclined projections placed on the inner side of the frame-ring and on the outer side of the mold may be employed. These projections would be arranged to operate in the well-known manner and lock the mold rigidly in its place.

In Figs. 4, 5, 6, and 7 I have shown the manner of constructing an open-and-shut mold and its application in my improved frame. The mold is provided with the side wedges, $a^7$, and is placed and held in the frame-ring $a'$, as hereinbefore described. Ordinarily no other means for holding the open-and-shut mold need be provided than the frame-ring $a'$; but as an additional security I have formed the top of the mold so that it will receive a mold-ring, $b$.

The mold-ring $b$ is provided with a central opening conforming to the top of the mold to which it is applied, so that the plunger can pass through it into the said mold. It is provided with a circular rim or flange, $b'$, which projects downward and fits snugly around the outer side of the upper rim of the mold, as shown in Fig. 5. This binds the mold at the top, while the ring $a'$ binds it at the bottom and prevents any possible spreading.

In sectional molds I sometimes employ a ring, $b$, made with vertical arms $b^2$ $b^2$, which extend downward and tighten on projections $a^7$, provided additionally to those required for use with the projections $a^8$. When it is desired to have a mold with a broad strong rim surrounding its upper end a groove may be formed in its upper surface, which groove will receive the flange $b'$, as shown in Fig. 7.

In Figs. 8, 9, and 10 I have shown a mold, B, for forming stem-ware. This mold is formed with a bowl, $c$, and a foot, B', made in two parts, $c'$ $c'$. The parts $c'$ $c'$ are each formed with a wing, $c^2$, the upper end of which is hinged to the side of the bowl $c$, as shown. The two parts are snugly jointed to the under side of the bowl and to each other, as shown. The foot B' is cut away on opposite sides, as shown in Fig. 10, and the parts $c'$ $c'$ are each provided with a handle, $c^3$, which slightly overbalances it, and so that when the mold is inverted the said parts $c'$ $c'$ will fall apart, as shown in Fig. 9. The bottom of the foot B fits within the flange or raised ring $a^{10}$ on the bottom plate, $a$, and the wedges $a^8$ bind on the wedges $a^7$, arranged on the outer edges of the parts $c'$ $c'$.

In Figs. 11 to 15, inclusive, I have illustrated the device as specially adapted for use in the steam-press. The bottom plate, $a$, and the ring $a'$ are united rigidly together, and the disk $a^2$ is removable. A recess, $d$, is formed in the bottom plate, in which I place a relieving-plate, $d'$, which is provided with a handle, $d^2$, which projects through a slot, $d^3$, in the side, as shown. The slot $d^3$ permits the handle $d^2$ to be moved laterally, which movement turns the plate $d'$. On the upper side, and at the center of the plate $d'$, I fix a cam, $d^4$, which moves on a corresponding cam fixed on the under side of the movable bottom or disk $e$ of the ring $a'$. The movable bottom or disk $e$ employed in this device (shown in Fig. 1) corresponds to the disk $a^2$ (shown in Fig. 1,) except that it is removable. On it the mold or the bottom of the glass rests. The bottom $e$ has a cam, $e'$, which is acted upon by the cam $d^4$, and the bottom $e$ is thereby slightly raised and lifts the mold which rests on it. The bottom $e$ is provided with a handle, $e^2$, which passes through a vertical slot formed in the side of the ring. By this handle the bottom may be lifted entirely out of the ring $a'$. After the ware has been pressed in the mold the handle $d^2$ is moved laterally in the slot $d^3$, and the cam $d^4$ raises the bottom $e$, which lifts and relieves the mold from any binding force which may be between it and the frame-ring. The flange $f'$ fits snugly against the inner side of the frame-ring and holds the sections of the mold from spreading. The frame-ring and bottom plate, as shown in Fig. 12, are turned both together in order to fasten the mold in the frame-ring; or the mold itself may be turned. I have shown a rim or horizontal flange, $f'$, in the bottom of the mold $f$, Figs. 11 and 12, which is so formed and adapted to be turned under shoulders $f^2$ on the inner side of the frame-ring. To remove the mold the flange is turned from below the shoulders, after which the bottom $e$ is lifted, as hereinbefore described.

Figure 16:
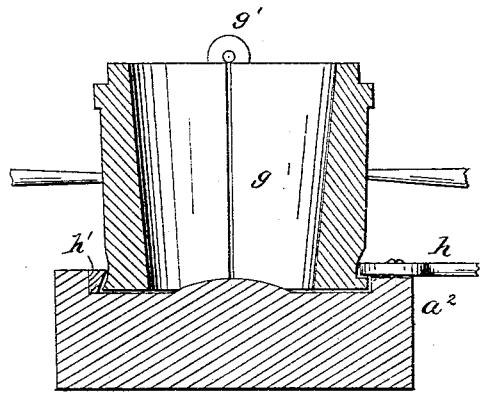
Figure 17:
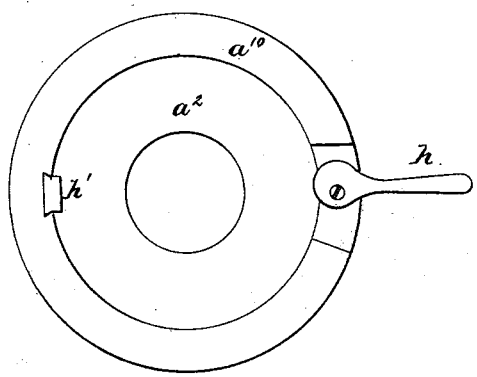

In Figs. 16 and 17 I have shown the disk $a^2$ as separate from the bottom plate, in order to more clearly illustrate its use for holding the bottom of a mold opening at the bottom end and having the sections hinged together at the top.

Molds opening at the bottom and having the halves hinged together at the top have been employed in the manufacture of blown glassware; but such molds have been heretofore impracticable in the manufacture of pressed glassware, because they could not be held from spreading when the plunger was forced into them. With my improved frame all these difficulties have been overcome. The disk $a^2$ has formed around its outer rim the upward-projecting ledge or ring $a^{10}$. Within this circular ledge or retaining-ring the foot or lower end of the mold $g$ is placed. The mold $g$ is formed to fit snugly within the ledge. In addition to the ledge $a^{10}$ the mold $g$ will be firmly clamped by suitable wedges $a^7$, placed on its sides, which bind within the wedge on the frame-ring, as in the other molds hereinbefore described.

The retaining means $h\ h'$ (shown in Figs. 16 and 17) are placed there for convenience, to show the mold locked to the disk when the latter is made in separate piece, as shown.

Figure 18:
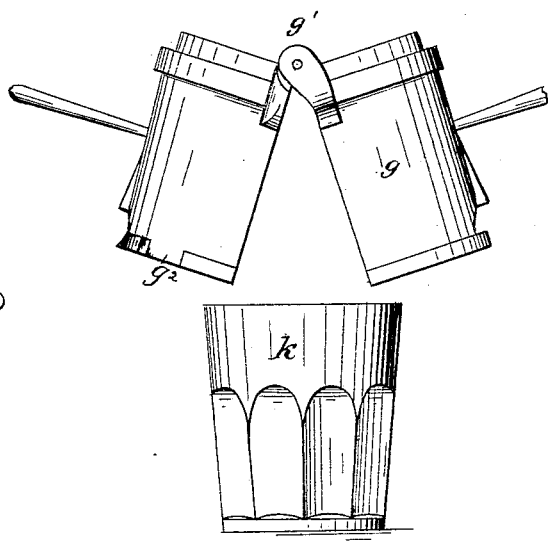

The sections of the mold $g$ are hinged together at their upper end, and so that they open at their lower end, as shown in Fig. 18. They are provided with ears $g'$, which project above the upper rim of the mold, as shown. The ears or lugs $g'$ form the hinge-joint between the sections, and they are so arranged with reference to the said sections that the mouth of the mold will be slightly enlarged when opened, as shown in Fig. 18. This removes the sections entirely clear of the glass before the mold is lifted. Again, this mold $g$ is specially adapted for use with those glass plat-forms which receive the ware and carry it vertically downward out of said mold.

If the position of the parts shown in Fig. 18 be inverted and arranged with the mold above the glass, it will be seen that the sections of the mold will automatically drop open and away from the ware, so that the latter is entirely relieved. In this arrangement the ware passes out of the mouth of the mold just in the opposite direction from that indicated in Fig. 18.

In the use of my improved frame it will be clearly understood that all strain is removed from the hinges of open-and-shut molds. The molds are so firmly secured in the frame that they become for the time being a solid mold, and will endure all the strain that a solid mold will sustain.

It will be seen that the removal of an open-and-shut mold and the putting of the same back into the frame can be done as quickly as the handling of the solid mold can be done in the ordinary way.

With the steam-press the ordinary mold and frame are almost impracticable. With my frame, and the molds made to suit it, as hereinbefore described, the steam-press can be operated to its highest capacity, and the number of pieces of ware turned out in a given time will far exceed the number which can be produced by the ordinary processes.

Having thus described my invention, what I claim, and desire to secure by Letters Patent, is—

1. In the manufacture of pressed glassware, the base-plate $a$, the vertical ring or annular bulwark $a'$, placed on the upper side of the base-plate and surrounding the central disk, $a^2$, and provided with cams or wedging projections on its inner side, forming a chamber or receptacle for receiving and locking the matrix to the base-plate, substantially as set forth.

2. In the manufacture of pressed glass, the base-plate $a$, constructed with a raised central disk, $a^2$, having its periphery provided with threads or other suitable retaining means, the ring or annular bulwark $a'$, provided on its inner periphery, and near its lower end, with screw-threads or other suitable fastenings, which interlock with and turn on the threads formed on the periphery of the disk $a^2$, and having inner projections to bind against and lock the matrix to base-plate without moving said base-plate or mold, substantially as set forth.

3. The base-plate $a$, provided with a central raised disk or seat, $a^2$, for supporting the mold, and having the annular rim or projection $a''$, the standards or supports $a^4$, having their lower ends fixed to the projecting rim $a''$, and having their upper ends bifurcated and extended upward to receive and hold the handles of the mold, and the adjustable annular bulwark $a'$, placed around the annular disk $a^2$, and provided with locking-shoulders on its inner periphery, and with the handle $a^9$, all arranged to receive and lock the matrix rigidly in position, substantially as set forth.

4. The combination of the base $a$, provided with an annular bulwark, $a'$, forming a chamber to receive and hold the matrix, and having a central vertical annular opening and an annular chamber, $d$, the disk or bottom $a^2$, made in separate pieces from the base, and placed within the annular chamber of the bulwark $a'$, and provided with the under cam-projection, $e'$, which projects through the central vertical opening in the base, and the disk $d'$, placed within the chamber $d$, having its rim held between the upper and under walls inclosing said chamber, and having the cam $d^4$ on its upper side, arranged to engage the cam $e'$, substantially as set forth.

5. The combination, with the bowl $c$, forming the upper or body portion of the matrix, of the wings $c'$, forming the lower portion of the matrix, and having upwardly-curved arms $c^2$, fitted to conform to the outer convexity of the bowl $c$, and hinged or pivoted to the upper edge of the bowl $c$, while their lower or stem portions are provided with meeting-surfaces, and upon their outer surfaces with cams $a^7$, substantially as and for the purpose specified.

6. In a glass-mold, the combination, with the matrix $f$, having the bottom flange, $f'$, of the base $a$, having a slot through its side and provided with the plate $d'$, having a handle, $d^2$, and a central cam, $d^4$, ring $a'$, having also a slot through its side, and the internal cam-projections $f^2$, and disk $e$, having the convexity $a^2$, cam $e'$, and handle $e^2$, substantially as and for the purpose set forth.

7. The combination, with the base-plate A, having the screw-threaded central disk, $a^2$, slotted stops $a^4$, and frame-ring $a'$, provided with cams $a^8$, of the sectional matrix $g$, with the upper ends of its sections connected together by ears $g'$, standing out therefrom, and united above the said ends of said sections, and provided at their lower or bottom ends with flanges, substantially as and for the purpose set forth.

In testimony that I claim the foregoing I have hereunto set my hand this 14th day of February, 1880.

WILLIAM HALEY.

Witnesses:
A. G. HEYLMUN,
W. N. WINE.